Sept. 22, 1953 P. NAMES 2,652,923
BERRY HARVESTER
Filed Aug. 22, 1951 3 Sheets-Sheet 1
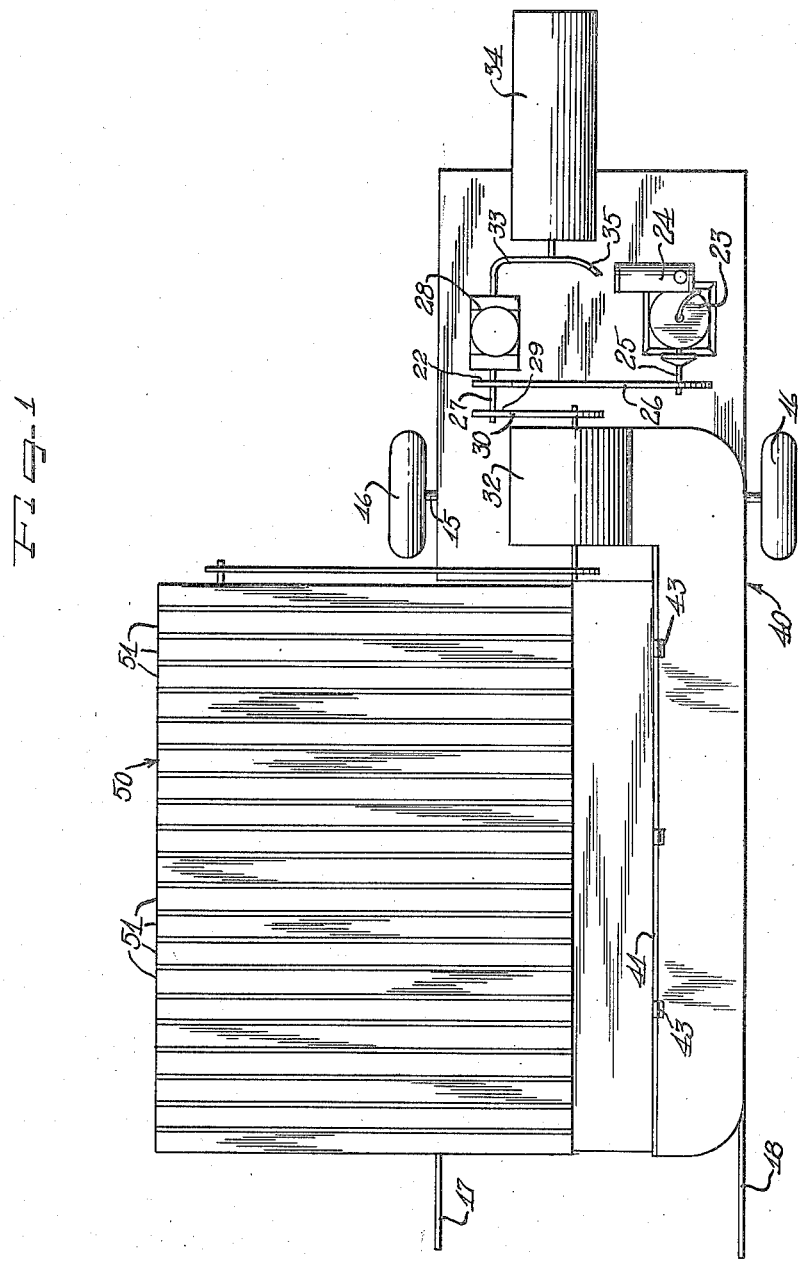
Inventor
Paul Names

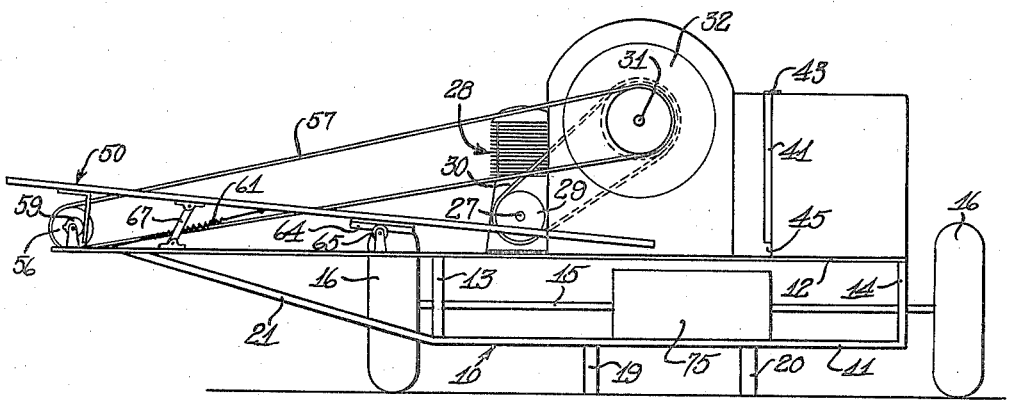

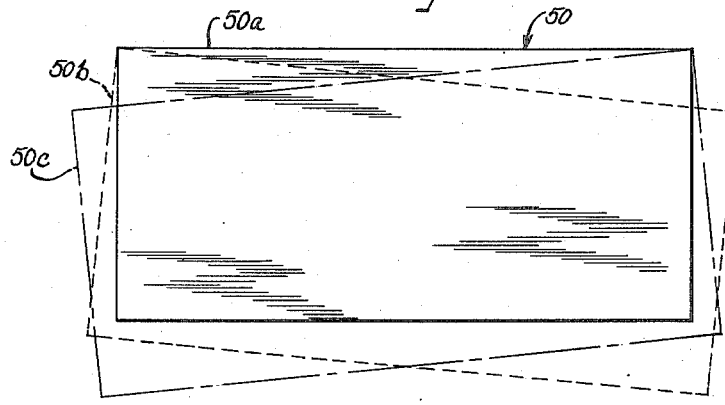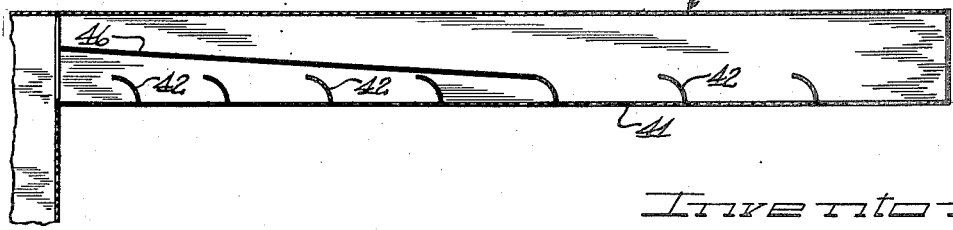

Patented Sept. 22, 1953

2,652,923

UNITED STATES PATENT OFFICE 2,652,923

BERRY HARVESTER

Paul Names, Puyallup, Wash.

Application August 22, 1951, Serial No. 243,033

5 Claims. (Cl. 209—134)

The present invention is directed to a berry harvester for collecting and cleaning ripe berries as the berries are shaken from vines.

The present invention is particularly applicable to the harvesting of berries which are delicate in structure when ripe, as in the case of the harvesting of raspberries. When a raspberry vine is shaken, only the berries that have been considerably ripened and hence contain the most sugar and oil, will become detached from the vine and fall. At this stage, the berries are the most delicate in structure and care must be taken to avoid applying any substantial pressure to the berries which would cause them to become flattened and unfit for sale. When a ripe raspberry falls on a stationary surface it tends to flatten at the point of impact sufficiently to prevent the berry rolling even on a fairly inclined surface. Consequently, ordinary inclined chutes are not feasible for directing such berries into their containers when they are shaken off the vines.

Another distinct problem which goes along with the harvesting of raspberries is the presence of trash associated with the berries which fall off the vine. This trash is largely composed of leaves and dried up stems to which the berries were previously attached. These stems are of such nature and shape that they would puncture the ripe berries if the berries were allowed to fall on them. The elimination of such trash from the berries prior to the depositing of the berries in their containers is one of the features of the berry harvester of the present invention.

In using the berry harvesting machine of the present invention, a more uniform grade of berries is obtained than results from hand picking, because the shaking of the vine which is used to deposit the berries on the harvesting machine itself is a means of classifying berries depending upon their degree of ripeness.

Another feature of the present invention resides in the harvesting and cleaning of the berries by providing means for blowing away trash and other contaminants such as pollen, microscopic life, and small insects from the berries prior to collecting them in their containers.

An object of the present invention is to provide an improved berry harvesting machine for collecting fragile berries without damage.

Another object of the present invention is to provide a berry harvesting machine containing means for eliminating or substantially reducing trash associated with the berries prior to collecting of the berries in their containers.

Another object of the present invention is to provide a machine for harvesting berries which reduces the cost of harvesting and eliminates the damage to the berries ordinarily associated with hand-picking.

In general, the berry harvesting machine of the present invention includes a power operated catching board with means for oscillating, vibrating, and rocking the catching board to keep the berries constantly in motion after they fall from the vine, and thereby minimize the danger of crushing.

The berry harvesting machine of the present invention is also provided with means for directing a current of air at the berries as they gravitate toward the lower end of the inclined catching board, thereby removing the trash which is associated with the berries prior to depositing the berries in their containers.

A further description of the present invention will be made in connection with the attached sheets of drawings, which illustrate a berry harvesting machine employing the novel features of the present invention.

In the drawings:

Figure 1 is a plan view of the improved berry harvesting machine of the present invention;

Figure 2 is an enlarged front elevational view of the berry harvesting machine;

Figure 3 is an enlarged fragmentary elevational view of the catching board illustrating the means employed for moving the catching board in various directions;

Figure 4 is a schematic view of Figure 3 with certain portions of the apparatus removed for purposes of clarity, and illustrating the rocking motion of the catching board;

Figure 5 is a schematic plan view of the catching board structure illustrating the various positions of the catching board during its oscillatory movement; and Figure 6 is a central longitudinal cross-sectional view of the interior of the air duct which supplies the stream of air at the berries to remove trash.

As shown in the drawings:

As best seen in Figures 1 and 2, the carriage on which the berry harvesting machine rides consists of a framework 10 including horizontally extending lower frame members 11, and horizontal upper frame members 12. Vertical frame members 13 and 14 extend between the lower frame members 11 and 12 and are provided with means for receiving an axle 15 carrying a pneumatic tire 16 at each end thereof to permit the carriage to be moved from place to place between the vines. To facilitate such movement, the upper frame member is also provided with a pair of extending handles 17 and 18 (Figure 1).

The lower frame member 11 also carries a plurality of spaced supports 19 and 20, and is provided with an upwardly extending extension 21 fixedly secured to the upper frame member 12 to rigidify the structure.

The upper frame member 12 provides a platform on which the remainder of the elements of the assembly are carried. As best seen in Figure 1, these elements include a prime mover 23, which in the illustrated embodiment, consists of a gasoline engine 23 having an associated fuel tank 24. The gasoline motor 23 drives a shaft 25, one end of the shaft 25 having a pulley secured thereto. A belt 26 supplies driving power from the shaft 25 to a pulley wheel 22 fixedly secured to a driven shaft 27 associated with an air compressor unit 28. Also fixedly secured to the shaft 27 is a second pulley 29 and a belt 30 trained therearound to drive a shaft 31 of a squirrel cage type blower 32.

The air compressor 28 compresses air into a line 33 feeding an air cylinder 34. Communicating with the line 33 and with the air cylinder 34 is a hose 35 which may be suitably provided with a nozzle (not shown) to supply an additional air stream for cleaning off from the catching board any slow-moving trash, after the ripe berries have rolled into their containers.

The blower 32 is in communication with an air duct 40 carried by the frame. The air duct 40 is provided with a door panel 41 secured to the air duct by a plurality of spaced hinges 43. As best seen in Figure 2, the bottom edge of the door member 41 is short of the bottom edge of the remainder of the air duct 40 thereby providing an elongated air passage 45 for directing air at the lower edge of the inclined catching board assembly. The interior structure of the air duct 40 is illustrated in the cross-sectional view of Figure 6. As shown in that drawing, the air duct 40 is provided with a plurality of arcuately shaped air distributing vanes 42, the vanes 42 preferably being secured to the base of the air duct 40 in adjustable position to regulate the direction of the air stream at various points along the air passage 45. The air duct 40 also includes a baffle 46 which channels the incoming air from the blower 32 against the baffles 42 located toward the left hand side of the air duct 40. Channeling of air toward the left end of the air duct is desirable because the berries, going through the various oscillations of the catching board, tend to gravitate toward the left end of the air duct, and it is desirable to supply a maximum amount of air toward that end of the air duct.

One of the features of the present invention resides in the particular type of catching board structure employed for directing the berries toward their containers. A plan view of a catching board 50 is illustrated in Figure 1, the catching board 50 consisting of a series of spaced slats 51, typical dimensions of the catching board structure including slats 2½" in width with a space of ⅛" between them. Alternatively, the width of these slats may be varied in alternate fashion with one slat about 2½" wide, and the next adjacent slat about ⅜" wide with a space of ⅛" between adjoining slats.

The means for oscillating and rocking the catching board 50 with respect to the frame are best illustrated in Figures 3 and 4. As shown in Figure 3, the upper frame member 12 carries spaced brackets 54 which rotatably receive a shaft 55 therethrough. A pulley 56 is keyed to one end of the shaft and is driven by means of a belt 57 from a pulley which is associated with the blower shaft 31. Disposed in spaced relationship along the shaft 55 are a plurality of eccentric cams 59, in an off-center position on the shaft 55. The eccentrics 59 abut a cam follower which, in the illustrated form of the invention, comprises an angle bracket 60 secured to the undersurface of the catching board. The bracket 60 is urged against the surface of the eccentrics 59 by means of a spring 61 having one end secured to the upper frame member 12 and the other end secured to the undersurface of the catching board.

The cams 59 are designed to provide a relatively long throw and a relatively short forward throw to the catching board during each revolution of the shaft 55. As illustrated in Figure 3, the eccentrics 59 are generally circular, and are each provided with small peripheral protrusions 63. Thus during each revolution of the shaft 55, the catching board structure is displaced a maximum amount as the bracket 60 rides against the portion of the periphery of the eccentric 59 which is farthest from its center of rotation about the shaft 55. This position is illustrated in both Figures 3 and 4. The minimum displacement will occur when the bracket 60 rides against the portion of the eccentric 59 immediately adjacent the projection 63. Immediately thereafter, the projection 63 strikes the bracket 60, reversing the direction of movement of the bracket 60, and exerting a slight forward throw against the bracket. Thus, during each complete revolution of the shaft 55 the catching board is subjected to two forward throws of different magnitudes.

The catching board 50 is also provided with an angular bracket 64 which defines a track for guiding an idler roller 65 rotatably mounted on the frame member 12. The purpose of the roller 65 is to provide a fulcrum for the rocking movement of the latching board 50, as will hereinafter be described.

The assembly is preferably provided with a plurality of eccentrics 59 of the type indicated whose relative position on the shaft 55 differs so as to produce an oscillatory motion in the plane of the catching board 50, as well as the back and forth movement of the catching board due to the cyclic displacement of the bracket 60 and eccentrics 59; in other words, the eccentrics 59 are preferably out of line with each other so that when one of the eccentrics 59 is exerting its maximum throw, the other eccentric is exerting its minimum throw, or is at some other intermediate position other than the position of maximum throw. The offsetting of these eccentrics results in an oscillatory movement of the catching board 50 in the plane of the catching board, and this movement is schematically illustrated in Figure 5. The full line drawing, 50a, is used to illustrate the center position of the catching board and the dashed line position illustrates the condition which occurs when one of the eccentrics is in position of maximum throw and the other is in position of minimum throw. The position illustrated by the section lines 50c illustrates the position of the other extreme, that is, when the second eccentric is in the position of maximum throw, the first eccentric is at the position of minimum throw or at some intermediate position.

In addition to the oscillatory and back and forth movement of the catching board 50, the catching board structure is provided with means for rocking the catching board structure simultaneously with the oscillatory, reciprocating movement. To provide for a rocking motion, the assembly is provided with a rocker arm 67 having one end pivotally secured to a mounting bracket 68 on the frame 12 and its other end pivotally secured to a mounting bracket 69 on the undersurface of the catching board 50. The resulting rocking movement imparted to the catching board 50 is schematically illustrated in Figure 4. In the full line position of the rocker arm 67 indicated in Figure 4, the eccentric 59 is in its position of maximum throw so that the rocker arm 67 is in its position of maximum displacement to the right as viewed in Figure 4. As the eccentric 59 continues to rotate, the spring 61 continuously urges the bracket 60 against the periphery of the eccentric 59, and the rocker arm 67 is moved slightly to the left, thus raising the left hand end of the catching board 50 a slight amount. The result is a rocking motion of the catching board 50 about the roller 65 as a fulcrum.

An extreme left position of the rocker arm 67 is illustrated by the dashed lines of Figure 4.

Thus, as the shaft 55 is rotated, the catching board 50 is subjected to three different types of motion—the first being a back and forth movement of the catching board due to the configuration of the eccentrics.

Simultaneously, the catching board is oscillated in the plane of the board by virtue of the alignment of the eccentrics in an offset manner, so that the eccentrics exert their maximum throw at different times. The third motion results from the rocking movement of the catching board 50 due to pivotal movement of the rocker arm 67. These three motions, combined with the action of gravity, cause any berries which are deposited on the surface of the catching board to roll toward the lower end of the catching board 50. The air passage 45 provides a stream of air directed at the berries to facilitate removal of any trash associated with the ripe berries.

Upon rolling off the extreme lower end of the catching board 50, the berries may be collected in suitable receptacles 75 or crates carried by the lower frame member 11. If desired, an additional blast of air from a nozzle associated with the hose 35 may be directed over the catching board by hand operation of the operator, to remove any stubborn trash.

From the foregoing it will be appreciated that the present invention provides a convenient means for harvesting ripe berries. Because of the unique motions imparted to the catching board surface, the berries have no tendency to be crushed and the pulsating motion of the catching board causes the berries to roll smoothly toward their containers. The removal of trash such as dried stems from the berries is also facilitated by the specially designed air directing means on the carriage. The machine can be conveniently operated by one operator and has been found to decrease substantially the time required for crating a given quantity of berries.

It will be understood that modifications and variations may be effected without departing from the scope of the novel concepts of the present invention.

I claim as my invention:

1. In a berry harvester, a movable frame, an inclined catching board reciprocably supported on said frame and extending therealong and having a higher receiving than discharge end, means on said frame for reciprocably driving said catching board, a berry container extending along the discharge end of said catching board in receiving relation with respect thereto, and an air duct spaced from the discharge end of said catching board and extending therealong and having deflecting means therein deflecting a stream of air to flow upwardly along said catching board for the entire width thereof and to remove stems, leaves and the like from berries dropped on said catching board prior to the falling of the berries on said catching board.

2. In a berry harvester of a type adapted to have berries dropped directly thereon while travelling along the berry bushes, a mobile frame, an inclined catching board mounted on and extending along said frame and having a higher receiving than discharge end, roller means supporting said catching board on said frame adjacent the discharge thereof, a rocking arm spaced from said roller means rockingly supporting the receiving end portion of said catching board on said frame, an eccentric on said frame engageable with said catching board for moving the same in one direction, yieldable means imparting return motion to said catching board, reciprocable movement of said catching board progressing berries dropped thereon downwardly therealong over the discharge end thereof, and means removing stems, leaves and the like from berries while falling onto said catching board prior to the time when the berries reach said catching board comprising an air duct extending along the discharge end of said catching board and having deflecting means therein, deflecting air upwardly along said catching board for the entire width thereof.

3. In a berry harvester, a mobile frame, an inclined reciprocably movable catching board extending along said frame and having a higher receiving than discharge end, said catching board comprising a plurality of spaced slats extending in the direction of reciprocation thereof, roller means supporting said catching board on said frame adjacent the discharge end thereof, rocking means supporting said catching board on said frame adjacent the receiving end thereof, cam means associated with said catching board for moving the same in one direction, spring means biasing said catching board into engagement with said cam means, means rotatably driving said cam means, and said cam means comprising two cams, the maximum throw of one of which is spaced from the maximum throw of the other for imparting lateral and longitudinal reciprocation of said catching board in the plane thereof for progressing the berries downwardly along said catching board and stems, leaves and the like falling on said board to fall between said slots.

4. In a berry harvester, a mobile frame, an inclined reciprocably movable catching board extending along said frame and having a higher receiving than discharge end, said catching board comprising a plurality of spaced slats extending in the direction of reciprocation thereof, roller means supporting said catching board on said frame adjacent the discharge end thereof, rocking means supporting said catching board on said frame adjacent the receiving end thereof, cam means associated with said catching board for moving the same in one direction, spring means biasing said catching board into engagement with said cam means, means rotatably driving said cam means, and said cam means comprising two cams, the maximum throw of one of which is spaced from the maximum throw of the other for imparting lateral and longitudinal reciprocation of said catching board in the plane thereof, a container on said frame and extending along the discharge end of said catching board in berry receiving relation with respect thereto, and means extending along the discharge end of said catching board in spaced relation with respect thereto and having deflecting means therein for directing air over said container and along said catching board to remove stems, leaves and the like from berries dropped onto said catching board prior to engagement of the berries with the board.

5. In a berry harvester, a mobile frame, an inclined catching board extending along said frame and having a higher receiving than discharge end, a berry container on said frame extending along the discharge end of said catching board in berry receiving relation with respect thereto, means reciprocably supporting said catching board on said frame comprising roller support means adjacent the forward end of said catching board, and rocking arms spaced rearwardly of said roller support means and supporting the rear end portion of said catching board, and means for reciprocably moving said catching board comprising engaging members depending from said catching board adjacent the rear end thereof, a shaft journaled on said frame having two spaced cams thereon engageable with said engaging members, spring means maintaining said engaging members in engagement with said cams, the throw of one of said cams being spaced radially of the throw of the other, and said cams imparting a lateral oscillating movement to said catching board during reciprocable movement of the same.

PAUL NAMES.

References Cited in the file of this patent

UNITED STATES PATENTS

| Number | Name | Date |
|---|---|---|
| 1,962,668 | Olney | June 12, 1934 |
| 2,356,465 | McKenzie | Aug. 22, 1944 |